US010632437B2

(12) United States Patent
Ryi et al.

(10) Patent No.: US 10,632,437 B2
(45) Date of Patent: Apr. 28, 2020

(54) SHELL-AND-TUBE TYPE REACTOR FOR REFORMING NATURAL GAS AND A PREPARATION METHOD OF SYNGAS OR HYDROGEN GAS BY USING THE SAME

(71) Applicant: KOREA INSTITUTE OF ENERGY RESEARCH, Daejeon (KR)

(72) Inventors: Shin Kun Ryi, Sejong (KR); Jae Yun Han, Gyeonggi-do (KR); Yong Seog Seo, Daejeon (KR); Jung Hyun Lee, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 29 days.

(21) Appl. No.: 15/121,971

(22) PCT Filed: Sep. 1, 2015

(86) PCT No.: PCT/KR2015/009205
§ 371 (c)(1),
(2) Date: Apr. 11, 2017

(87) PCT Pub. No.: WO2016/064084
PCT Pub. Date: Apr. 28, 2016

(65) Prior Publication Data
US 2017/0216806 A1    Aug. 3, 2017

(30) Foreign Application Priority Data
Oct. 22, 2014    (KR) .......................... 10-2014-0143451

(51) Int. Cl.
*B01J 8/06*    (2006.01)
*C01B 3/38*    (2006.01)
*B01J 19/24*   (2006.01)

(52) U.S. Cl.
CPC ........... *B01J 8/067* (2013.01); *B01J 19/2475* (2013.01); *C01B 3/38* (2013.01); *C01B 3/384* (2013.01);
(Continued)

(58) Field of Classification Search
CPC ................................. B01J 8/067; C01B 3/38
See application file for complete search history.

(56) References Cited

U.S. PATENT DOCUMENTS

2006/0248800 A1    11/2006  Miglin et al.
2008/0000350 A1*   1/2008   Mundschau ......... B01D 53/226
                                                         95/56
(Continued)

FOREIGN PATENT DOCUMENTS

CN    101437752    5/2009
CN    103596671    2/2014
(Continued)

OTHER PUBLICATIONS

Office Action in corresponding Korean Patent Application No. KR 10-2015-0123860 dated May 1, 2017.
(Continued)

*Primary Examiner* — Douglas B Call
(74) *Attorney, Agent, or Firm* — Hovey Williams LLP

(57) ABSTRACT

The present invention relates to a shell-and-tube type reactor for reforming natural gas and a method for manufacturing syngas or hydrogen gas by using the same. According to the present invention, a shell-and-tube type reactor for reforming natural gas comprises a reaction catalyst for reforming natural gas, which is filled in a reactor shell; at least one tube for separating hydrogen; and a tube for an exothermic reaction or a tube type heat-exchanger for heating, which is disposed at the center of the reactor so as to have excellent operating efficiency and enable production of high-purity (Continued)

hydrogen and collection of carbon dioxide simultaneously along with a reaction.

14 Claims, 7 Drawing Sheets

(52) U.S. Cl.
CPC .............. *B01J 2208/00194* (2013.01); *B01J 2208/00504* (2013.01); *C01B 2203/0233* (2013.01); *C01B 2203/0288* (2013.01); *C01B 2203/041* (2013.01); *C01B 2203/0475* (2013.01); *C01B 2203/0811* (2013.01); *C01B 2203/0833* (2013.01); *C01B 2203/1058* (2013.01); *C01B 2203/127* (2013.01); *C01B 2203/146* (2013.01)

(56) References Cited

U.S. PATENT DOCUMENTS

2008/0093583 A1* 4/2008 van den Oosterkamp ............... B01J 8/025
252/373

2010/0178219 A1* 7/2010 Verykios ............... C01B 3/384
422/621
2013/0323162 A1* 12/2013 De Groot ............... B01J 8/009
423/651

FOREIGN PATENT DOCUMENTS

| EP | 1679111 | 7/2006 | |
|---|---|---|---|
| JP | 2007-001792 | 11/2007 | |
| KR | 10-2009-0127887 | 12/2009 | |
| KR | 10-1388649 | 4/2014 | |
| KR | 10-1401108 | 5/2014 | |
| WO | WO2012112046 | * | 8/2012 |

OTHER PUBLICATIONS

PCT/KR2015/009205 International Search Report dated Nov. 20, 2015.
Office Action in corresponding Chinese Patent Application No. 201580057361.2, dated Jun. 11, 2019.

* cited by examiner

[FIG. 1]
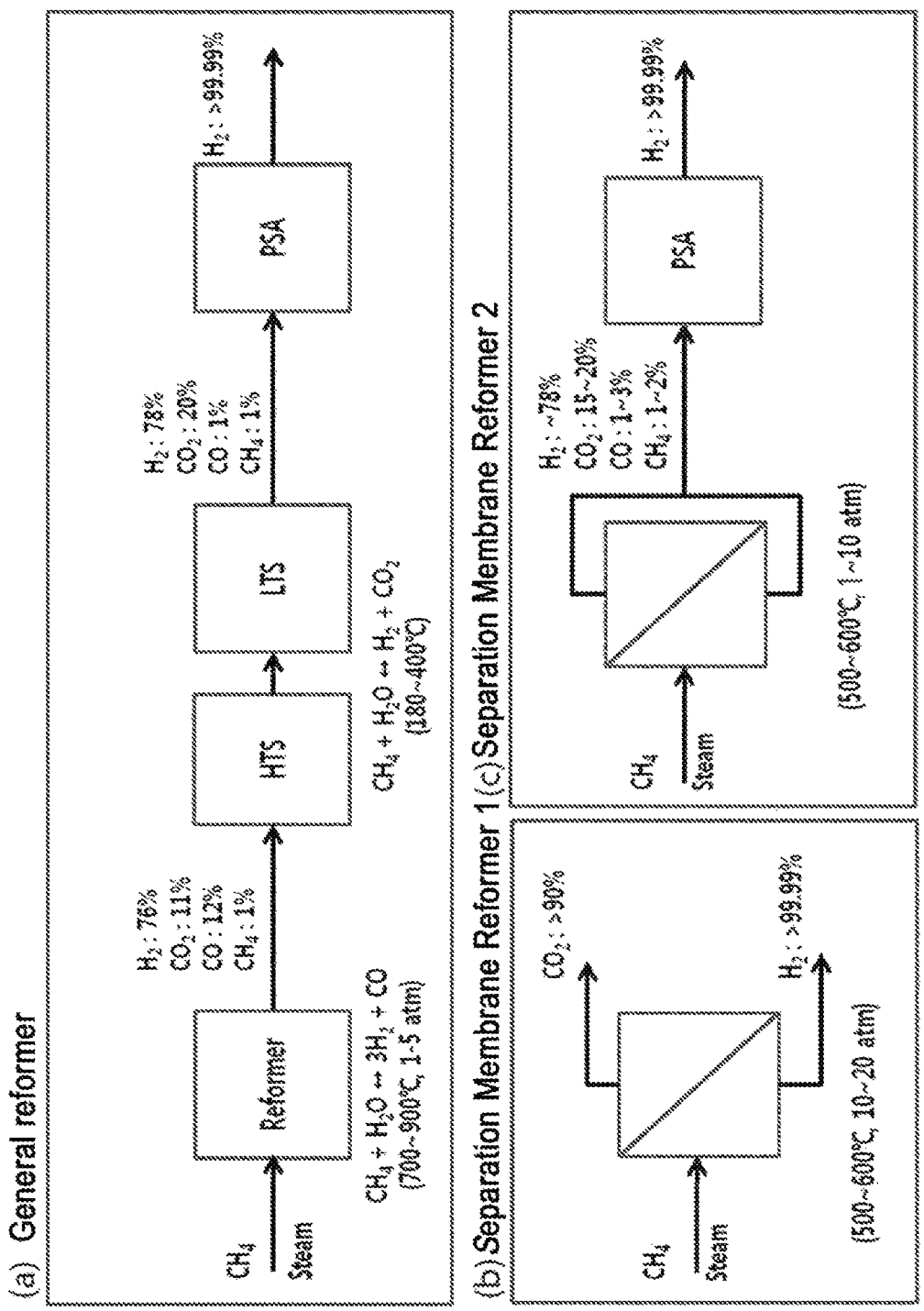

[FIG. 2]
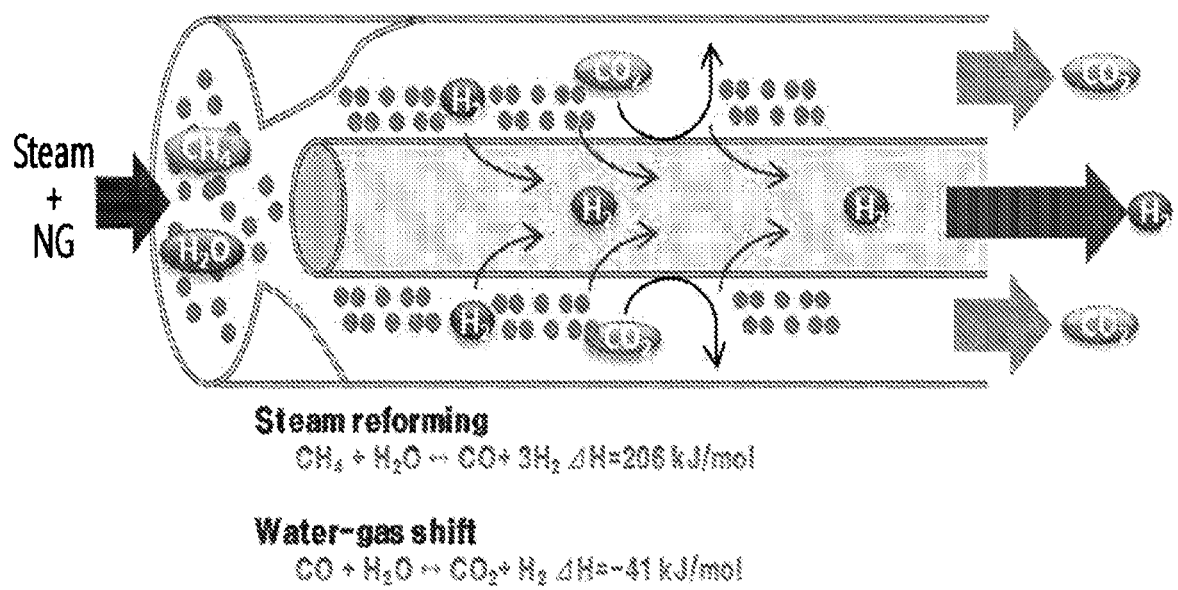

[FIG. 3]
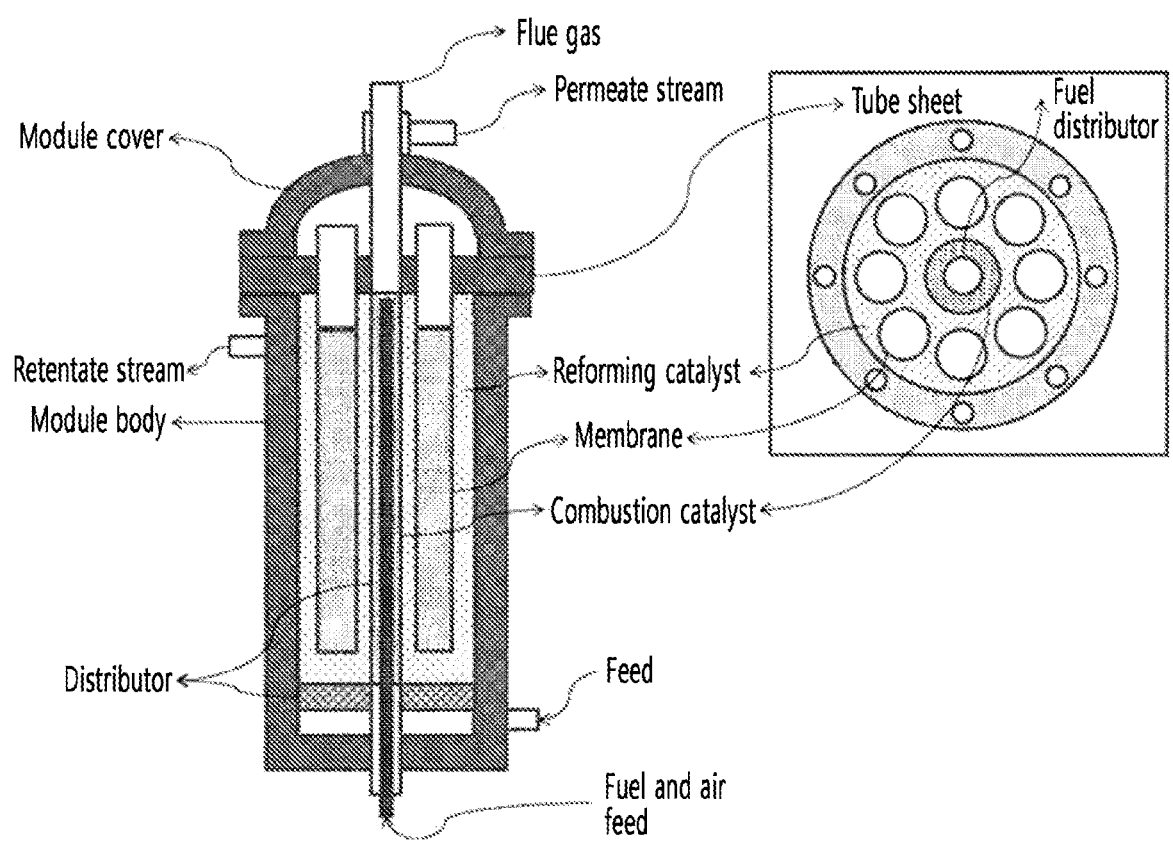

[FIG. 4]
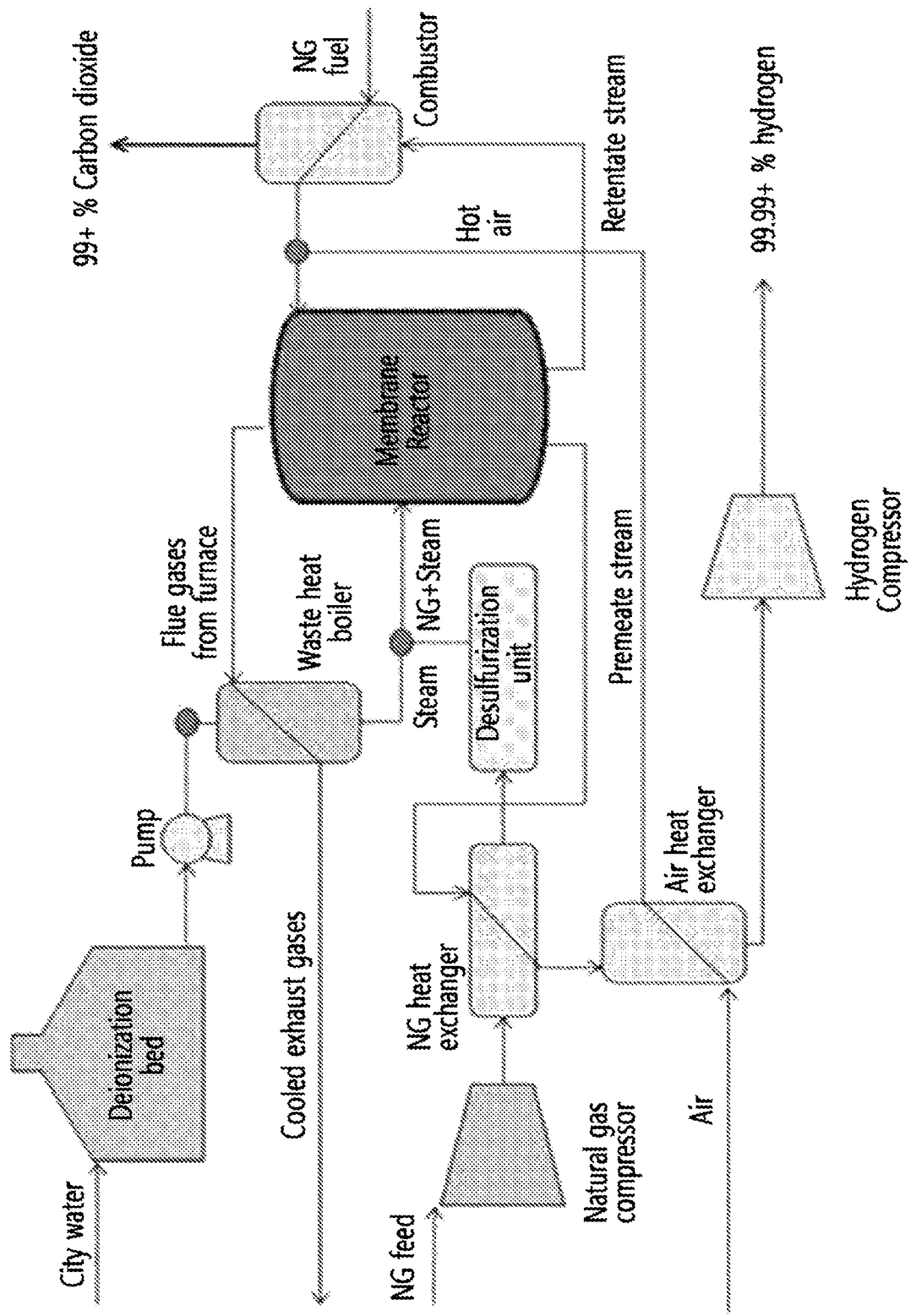

【FIG. 5a】
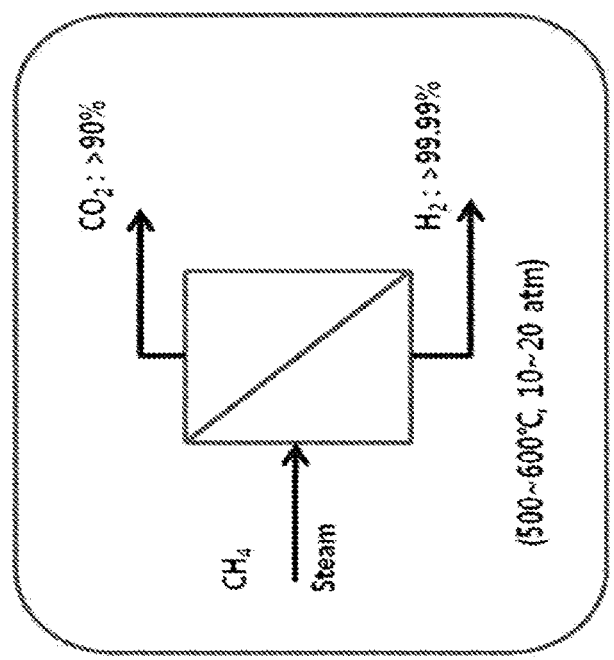
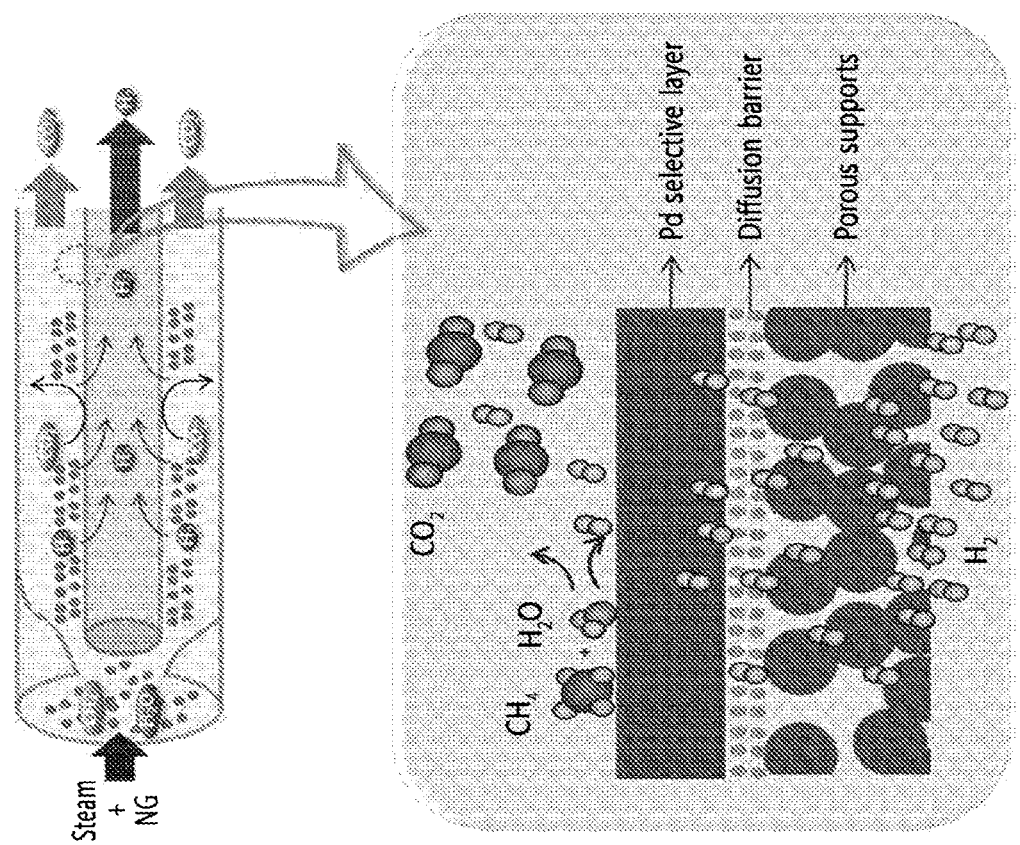

【FIG. 5b】
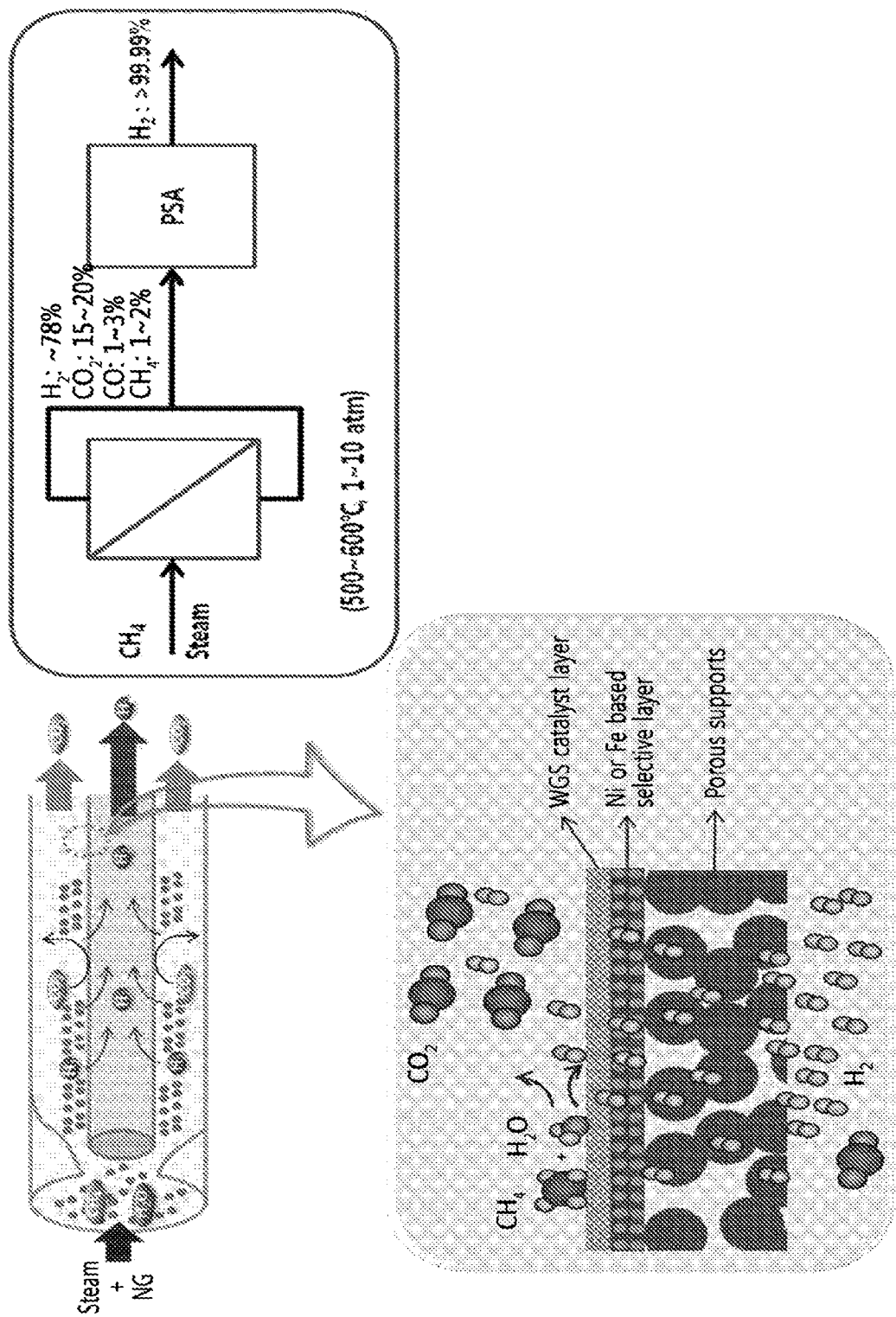

[FIG. 6]
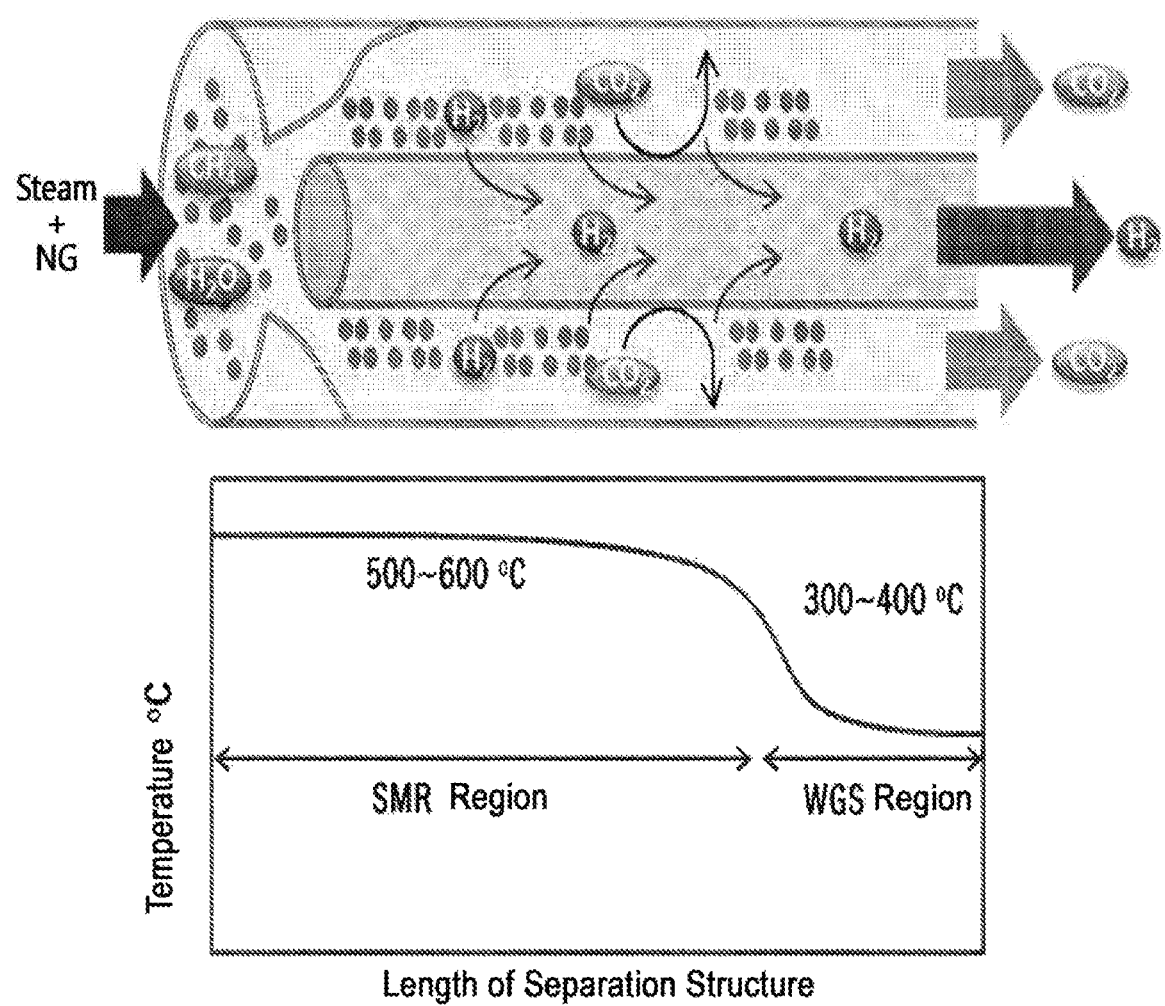

SHELL-AND-TUBE TYPE REACTOR FOR REFORMING NATURAL GAS AND A PREPARATION METHOD OF SYNGAS OR HYDROGEN GAS BY USING THE SAME

RELATED APPLICATIONS

This application is the National Stage of International Patent Application No. PCT/KR2015/009205, filed Sep. 1, 2015, which is hereby incorporated by reference in its entirety, and which claims priority to Korean Patent Application No. 10-2014-0143451, filed Oct. 22, 2014.

TECHNICAL FIELD

The present invention relates to a shell-and-tube reactor for reforming natural gas and a preparation method of syngas or hydrogen gas by using the same.

BACKGROUND ART

Natural gas, coal, and biomass produce syngas via a reforming reaction, and the produced syngas is used for synthetic raw materials of chemical compounds, fuels, and industrial processes by undergoing various downstream processing.

In addition, the produced syngas contains a large amount of hydrogen, and the hydrogen is used in the ammonia synthesis, refinery process, smelting process, polysilicon manufacturing process, semiconductor manufacturing process, LED manufacturing process, etc. after undergoing a purification process and is thus an essential substance in modern industry. Recently, research for using hydrogen in the smelting process even in the steel industry is currently in progress in order to achieve the goal of reducing carbon dioxide.

In particular, the value of hydrogen is constantly growing as a clean energy source having a high efficiency and no exhaust pollutants when used in conjunction with a fuel cell. However, the preparation process of syngas in a series of processes, which produce hydrogen from natural gas, coal and biomass and use the same, accounts for 60% to 70% of the total cost of production, and thus, there is a need to develop a preparation process of syngas with excellent efficiency.

Meanwhile, the development of small- and medium-scale hydrogen production plants with a gas flow rate of 50 Nm³/h to 5000 Nm³/h for supplying hydrogen in the field is actively underway to diverge from the existing method of supplying by transportation, which is used in various industrial facilities such as those for ammonia synthesis, oil refinery processes, semiconductor manufacturing processes, LED manufacturing processes, polysilicon manufacturing processes, the iron and steel industry, etc.

The essence of the small- and medium-scale hydrogen production plants is that they must be economical compared to a transportation method based on mass production, and that they must enable flexible operation according to the circumstances of consumers.

The small- and medium-scale hydrogen production plants with a gas flow rate of 50 Nm³/h to 5000 Nm³/h are a technology which can compete with liquid hydrogen transportation and electrolysis, and the development of a process with excellent efficiency is absolutely necessary in order for the method of reforming natural gas to secure economic feasibility.

In addition, in order to take advantage of natural gas as a clean energy source although the natural gas is fossil fuel, the problems with carbon dioxide emission, which is the main cause of global warming, must first be resolved. Clean energy production technology using natural gas may be completed by collecting carbon dioxide before the release thereof to the atmosphere concurrently with the hydrogen production (pre-combustion CCS).

The method for preparing syngas from natural gas is largely classified into steam reforming of methane (SMR), partial oxidation of methane using oxygen (POX), carbon dioxide reforming of methane (CDR), steam carbon dioxide reforming of methane (SCR), in which steam reforming reaction and carbon dioxide reforming are combined, etc. The ratio of carbon monoxide and hydrogen ($H_2/CO$) produced from each reforming reaction may be different, and thus the various reforming reactions may be used depending on the ratio optimally required in the subsequent process.

Meanwhile, the hydrogen production process by the conventional reforming reaction of natural gas is composed of SMR (700° C. to 900° C.)-HTS (300° C. to 450° C.)-LTS (200° C. to 250° C.)-PSA, as shown in FIG. 1a. The reformer used in the conventional method of the hydrogen production process requires a high operating temperature in the range of 700° C. to 900° C., and thus has the disadvantages of low operating efficiency and low economic feasibility owing to being composed of the high-temperature materials. Further, the conventional method of the hydrogen production process is carried out in separate reactors, and therefore, it is difficult to design a compact process.

Steam methane reforming (SMR) is a reaction which reforms natural gas in the presence of water vapor using a catalyst and then chemically converts the same into syngas (mixture gas of $CO+H_2$) as shown in Reaction 1 below.

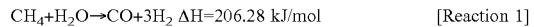

$$CH_4+H_2O \rightarrow CO+3H_2 \quad \Delta H=206.28 \text{ kJ/mol} \qquad \text{[Reaction 1]}$$

SMR has a $CO_2/H_2$ ratio of 0.25 among the gas produced, and shows advantages in that it has a low $CO_2$ production ratio and enables a larger amount of hydrogen to be obtained from a certain amount of hydrocarbons, compared to partial oxidation using hydrocarbons as raw materials.

The fluid produced from the SMR process contains a high $CO/H_2$ ratio, and thus, CO may be converted into $CO_2$ and $H_2$ by a shift reaction as shown in Reaction 2 below. This is known as water-gas shift reaction (WGS).

$$CO+H_2O \rightarrow CO_2+H_2 \quad \Delta H=-41.3 \text{ kJ/mol} \qquad \text{[Reaction 2]}$$

The shift reaction can be divided into a high-temperature shift reaction and a low-temperature shift reaction depending on the temperatures.

Therefore, the SMR process may lead to the high-temperature shift reaction (HTS) and the low-temperature shift reaction (LTS) thereafter.

The high-temperature shift reaction may be performed at 350° C. to 550° C. using $Fe_2O_3$ as a catalyst in which $Cr_2O_3$ is added as a co-catalyst. The chemical composition of a typical catalyst used is Fe (56.5% to 57.5%) and Cr (5.6% to 6.0%). In general, the high-temperature shift reaction has a high CO conversion rate as the space velocity decreases, and the reaction rate increases as the diameter of catalyst particle decreases. $H_2S$ does not affect the catalyst reaction in a significantly broad temperature range, but even a small amount of $H_2S$ decreases the rate of the high-temperature shift reaction if the temperature decreases. That is, $H_2S$ with 4% concentration does not affect the reaction rate at 410° C. or higher, but $H_2S$ with a concentration only within 0.5% does not affect the reaction rate at 350° C.

The low-temperature shift reaction is performed at 200° C. to 250° C., and uses catalysts such as CuO (15% to 31%)/ZnO (36% to 62%)/Al$_2$O$_3$ (0% to 40%). Cr-based low-temperature shift catalysts have recently been developed. The minimum reaction temperature must be higher than the dew point of water gas, and the concentration of CO in the exhaust gas becomes 1% or less. The low-temperature shift catalysts are used once they are converted to a reduced state through an initial activation process. Since H$_2$S causes severe deactivation, it is necessary that a H$_2$S removal process be carried out in the beginning of the low-temperature shift reaction such that the concentration of H$_2$S is maintained at 0.1 ppm or less.

The shift reaction above may lead to a hydrogen purification process thereafter. The hydrogen purification process may include not only PSA (pressure swing adsorption), but also a membrane separation method, a cryogenic method, etc. For example, PSA may be composed of 4 to 12 adsorption beds. A molecular sieve may be used as an adsorbent, and 80% to 92% of H$_2$ may be separated in the mixed gas flow of 400 psig to 500 psig. After the completion of adsorption, the adsorbent may be regenerated by reducing the pressure to 5 psig through a purge process using H$_2$.

Under the circumstances above, the present inventors prepared a shell-and-tube type reactor for reforming natural gas equipped with at least one tube for separating hydrogen, and a tube for an exothermic reaction or a tube type heat-exchanger for heating, which is disposed at the center of the reactor, and in which a reaction catalyst for reforming the natural gas is filled in a reactor shell, and found that the reactor has excellent operating efficiency upon examination thereof and enables production of high-purity hydrogen and collection of carbon dioxide simultaneously with the reaction, thereby completing the invention.

DISCLOSURE

Technical Problem

The objective of the present invention is to provide a shell-and-tube type reactor for reforming natural gas which has excellent operating efficiency and enables production of high-purity hydrogen and collection of carbon dioxide simultaneously with the reaction.

Another objective of the present invention is to provide a method of preparing syngas or hydrogen gas effectively from natural gas by using the reactor.

Technical Solution

A first aspect of the present invention provides a shell-and-tube type reactor for reforming natural gas, comprising a reaction catalyst for reforming natural gas, which is filled in a reactor shell; at least one tube for separating hydrogen; and a tube for an exothermic reaction or a tube type heat-exchanger for heating, which is disposed at the center of the reactor.

A second aspect of the present invention provides a method of preparing syngas or hydrogen gas from natural gas by using the shell-and-tube type reactor.

Hereinbelow, the present invention will be described in detail.

Unlike the conventional methods where multi-step processes are carried out in separate reactors, the present invention provides a shell-and-tube type reactor which is capable of separating hydrogen simultaneously with a reforming reaction of natural gas, as illustrated in FIG. 1b or 1c, as one of embodiments of the present invention.

The shell-and-tube type reactor for reforming natural gas of the present invention is characterized as having a tube for an exothermic reaction or a tube type heat-exchanger for heating, which is disposed at the center of the reactor, and a reaction catalyst for reforming natural gas filled in a reactor shell.

In addition, the shell-and-tube type reactor for reforming natural gas of the present invention is characterized as having a reaction catalyst for reforming natural gas, which is filled in a reactor shell; at least one tube for separating hydrogen; and a tube for an exothermic reaction or a tube type heat-exchanger for heating, which is disposed at the center of the reactor.

FIG. 2 shows a schematic diagram illustrating the process in which the production of high-purity hydrogen and the collection of carbon dioxide occur simultaneously with the reforming reaction of natural gas in the separation membrane reactor according to one embodiment of the present invention.

As shown in FIG. 2, in the separation membrane reactor of the present invention, the reforming reaction of natural gas between natural gas and steam supplied into the reactor occurs inside of the reactor shell in which the reforming catalyst is filled, and herein, the hydrogen in the fluid comprising hydrogen and carbon dioxide, etc. produced by the reforming reaction is selectively separated into the tube for separating hydrogen, thereby enabling production of high-purity hydrogen and collection of carbon dioxide simultaneously, and therefore, the production efficiency of these gases is superior.

The reactor of the present invention separates hydrogen via the tube for separating hydrogen simultaneously with the reforming reaction of natural gas, thereby eliminating hydrogen within the reactor shell, in which the reforming reaction of natural gas occurs, and therefore, the efficiency of the reforming reaction of natural gas can be improved, and the reforming reaction of natural gas having similar efficiency may be performed at a lower temperature. Specifically, when the separation membrane reactor of the present invention is used, the reactor can be operated with similar reaction efficiency at a temperature lowered by 100° C. or more.

Therefore, when the separation membrane reactor of the present invention is used, not only it may secure the thermodynamic conversion rate even at a low temperature range of 500° C. to 600° C. as the thermodynamic equilibrium is destroyed by Le Châtelier's principle, but also the temperature of the reformer, which usually operates at 700° C. to 900° C., may be lowered to 500° C. to 600° C., thereby showing excellent operating efficiency, and because of the low temperature of the reformer, the reactor may be composed of medium- to low-temperature materials, which in turn enables the design of an economical reactor. In addition, as high-purity hydrogen can be produced and carbon dioxide collected simultaneously with the reaction, the subsequent hydrogen purification process and carbon dioxide-collecting process can be excluded, thereby enabling the design of a compact process, and thus, the present invention is an environmentally friendly clean energy production technology. That is, when the separation membrane reactor is used in the clean energy production technology using natural gas, it not only leads to the design of a compact process but also the economical operation thereof as high-purity hydrogen is produced simultaneously as carbon dioxide is collected. Further, the carbon dioxide is collected at high pressure due to the characteristics of the separation membrane reactor, and this leads to cost saving effects in transportation and storage, thereby enabling the design of an economical process.

FIG. 3 shows a schematic diagram illustrating the structure of a tube-type separation membrane module in the shell-and-tube type reactor for reforming natural gas according to one embodiment of the present invention.

As shown in FIG. 3, the shell-and-tube type reactor for reforming natural gas according to one embodiment of the present invention may have a structure that at least one tube for an exothermic reaction or at least one tube type heat-exchanger for heating is disposed within the reactor and a plurality of tubes for separating hydrogen is arranged circumferentially on the outside of the tube for an exothermic reaction or the heat-exchanger.

In the reactor of the present invention, the upper and lower parts of the tube for an exothermic reaction or the heat-exchanger and the upper and lower parts of the tubes for separating hydrogen may be fixed in the reactor by a tube sheet.

The reforming reaction of natural gas is a large endothermic reaction, and thus, the required heat may be supplied via a catalytic combustion by air of the combustion gas in the tube for an exothermic reaction disposed at the center of the reactor.

In the reactor of the present invention, the temperature ($T_1$) of the tube for an exothermic reaction or the tube type heat-exchanger for heating is higher than the temperature ($T_2$) of the reaction catalyst filled in the reactor shell, and syngas may be formed via an endothermic reaction by the reaction catalyst for reforming natural gas in the reactor shell as heat moves radially to the outside of the reactor from the tube for an exothermic reaction or the tube type heat-exchanger, which is disposed at the center of the reactor.

That is, the reactor according to the present invention has a heating means within the reactor, and the heat is delivered from the inside ($T_1$) of the reactor to the outside ($T_2$, $T_1>T_2$), and thus shows excellent thermal transfer efficiency. Herein, the heating means may have a combustion catalyst and supply the heat via an exothermic reaction, but it may have a heat-exchanger ($T_1$).

As shown in FIG. 3, the tube for an exothermic reaction may be filled with at least one catalyst which can catalyze the exothermic reaction.

The catalyst which can catalyze the exothermic reaction includes a combustion catalyst. Specifically, the combustion catalyst which can be used in the present invention includes a catalyst in which Pt/Rh is supported on cordierite, etc., but is not limited thereto.

Meanwhile, the reaction catalyst for reforming natural gas which can be filled into the reaction shell may include any form of catalyst capable of catalyzing the reforming reaction, such as pellet, bead, foam, powder, etc. More preferably, it may be a metal foam-based catalyst for the reforming reaction.

If the metal-foam catalyst is used, the thermal and mass transfer effects can be maximized, and the limitation of hydrogen recovery rate caused by a concentration gradient, which may be problematic in the tube-type separation membrane, can be overcome.

The essence of the design of the separation membrane reactor using metal foams is to overcome the problems of interdiffusion resulting from contact between the separation membrane and metal foam, when the metal-foam catalyst is disposed to outside of the separation membrane, and when the catalyst is coated onto the metal foam, this problem can be overcome by inserting a pole as a block for coating a catalyst material to the position at which the separation membrane meet, followed by coating the catalyst material.

The metal-foam catalyst which can be used in the present invention may be a catalyst in which a nickel catalyst is coated onto the surface of a foam-type metal structure composed of at least one metal selected from the group consisting of aluminum, iron, stainless steel, nickel, iron-chromium-aluminum alloy (Fecralloy), nickel-chromium alloy, copper, and copper-nickel alloy, but is not limited thereto.

The nickel catalyst may be $Ni/Al_2O_3$, $Ni/Al_2O_3/CaO$, or $Ni/MgAl_2O_4$, but is not limited thereto.

In the reactor of the present invention, the hydrogen in the syngas formed by the reaction catalyst for reforming natural gas in the reactor shell penetrates the tube for separating hydrogen and may then be concentrated or separated towards the inside of the tube for separating hydrogen.

The tube for separating hydrogen used in the present invention may preferably be the separation membrane having high hydrogen permeability.

The separation membrane which can be used has hydrogen selectivity in the syngas, and it may be a ceramic including silica, alumina, zirconia, yttria, ceria, YSZ, or a combination thereof; a metal including nickel, copper, iron, palladium, ruthenium, rhodium, platinum, or a combination thereof; or a complex composition in which the metal and ceramic are mixed. The separation membrane may be operated at 600° C. or higher.

For the ease of the modularization and the formation of a thin separation layer in the tube for separating hydrogen, a porous support may preferably be used.

In the present invention, the tube for separating hydrogen has a porous support; and a hydrogen separation membrane located on one side or both sides of the porous support (FIG. 5a), or the porous support itself may perform the function of the hydrogen separation membrane.

The hydrogen separation membrane, being a coating layer of a metal, may be formed outside or inside of the tube, based on the porous support. It may be a dense metal membrane as the palladium-based hydrogen separation membrane composed of palladium or palladium alloy. The separation membrane may be operated even at 600° C. or higher. In addition, the hydrogen separation membrane composed of nickel, nickel alloy, iron, or iron alloy may be used.

The tube for separating hydrogen may further comprise a diffusion barrier layer between the porous support and the metal-based hydrogen separation membrane as shown in FIG. 5a, in the case where metals such as palladium and palladium alloys or nickel, iron, copper, etc. are used.

In addition, the tube for separating hydrogen comprises a porous support, a hydrogen separation layer located on a first side of the porous support, and a catalyst layer for water-gas-shift reaction (WGS) located on the hydrogen separation layer or a second side of the porous support (FIG. 5b).

In the reactor of the present invention, the catalyst for the low-temperature SMR may be filled into the vicinity of the hydrogen separation membrane having hydrogen permeability, or may be used by coating onto the tube for separating hydrogen. In addition, a membrane composed of a catalyst for the low-temperature SMR may be used as a separation tube having hydrogen permeability.

In the present invention, the porous support may be composed of metal or ceramic materials. The materials of the porous metal may include stainless steel, nickel, Inconel, etc. The materials of the porous ceramic may include oxides of Al, Ti, Zr, Si, etc. The non-limiting examples of the porous metal tube include tube-type alumina supports and porous stainless steel tubes.

A surface treatment process may be performed in order to control the surface roughness of the porous support. The surface treatment process may include a polishing process, such as chemical mechanical polishing (CMP), or a process using plasma.

It is preferable that the size of the surface pores formed on the porous support is not too large or too small. For example, when the size of the surface pores of the porous support is less than 0.001 µm, the permeability of the porous support itself is low, and thus it is difficult for it to function as a porous support. Whereas when the size of the surface pores exceeds 10 µm, it is disadvantageous in that the thickness of the hydrogen separation layer must be formed to be thick, as the diameter of the pore is too large. Therefore, it is preferable that the surface pores of the porous support are formed to have a size of 0.001 µm to 10 µm.

Optionally, the present invention may form a porous shielding layer on the porous metal support to prevent the diffusion which can occur between the metal support and palladium which is the component of the separation membrane layer and, the porous shielding layer can penetrate hydrogen through pores/gaps thereof and may be formed of a ceramic material. The non-limiting examples of the shielding layer include oxide-based, nitride-based, and carbide-based ceramics comprising at least one of Ti, Zr, Al, Si, Ce, La, Sr, Cr, V, Nb, Ga, Ta, W, and Mo. Preferably, it may be an oxide based-ceramic such as $TiO_y$, $ZrO_y$, $Al_2O_2$ ($1<y\leq2$ or $2<z\leq3$). The shielding layer may be formed by a dry spray method, wet spray method, or sol-gel method using metal oxide powder.

The thickness of the shielding layer may be determined by considering the preparation conditions and the conditions of use of the hydrogen separation membrane. For example, considering the conditions of use at 400° C., $TiO_y$ may be formed with a thickness of 100 nm to 200 nm as a shielding layer. In contrast, $ZrO_y$ may be formed with a thickness of 500 nm to 800 nm as a shielding layer.

Meanwhile, a spray coating method which facilitates mass production is preferably introduced in order to compose a diffusion barrier layer on the surface of the support. The spray coating method may resolve the problems of forming defects in the support which can occur when coating the shielding layer, and a large-area coating may be easily carried out.

A dense palladium-containing layer may preferably be coated as a catalyst layer for separating hydrogen on the outside or the inside of the support.

In the present invention, the Pd-containing layer may be composed of palladium or palladium alloy. The palladium alloy may be an alloy of Pd and at least one metal selected from the group consisting of Au, Ag, Cu, Ni, Ru, and Rh. The Pd-containing layer further comprising a layer such as Pd/Cu, Pd/Au, Pd/Ag, Pd/Pt, etc. as multi-layer structure is also within the scope of the invention.

The Pd-containing layer may be formed with a thickness of 0.1 µm to 20 µm. When the thickness is less than 0.1 µm, it may be advantageous as the hydrogen permeability is further improved, but it is difficult to densely prepare a metal separation membrane, which leads to a shorter life span of the metal separation membrane. Whereas when the layer is formed into a thickness of greater than 20 µm, it may be densely formed, but the hydrogen permeability relatively decreases. In addition, the overall production cost for the hydrogen separation membrane increases due to the thick metal separation membrane composed of an expensive palladium with a thickness of greater than 20 µm, which is problematic. Preferably, considering the properties of the lifespan and the hydrogen permeability of the metal separation membrane, etc., the layer is preferably formed with a thickness of 1 µm to 10 µm.

Due to the characteristics of the hydrogen permeability in the separation membrane, the hydrogen permeability increases as the thickness of the membrane becomes thinner, and therefore, the thickness of the Pd-containing layer as a metal separation membrane is preferably as thin as possible. The present invention may prepare the Pd-containing layer via sputtering, polishing, and electroless plating which uses a plating solution, thereby not only increasing the mechanical strength of a thin film, but also enabling formation of a dense metal membrane with no defect such as pin holes, while thinning the thickness of the layer.

The present invention employs the common sputtering method, the common polishing method, and the common electroless plating method to form the layer composed of Pd or Pd alloy, but is not limited to the conditions and materials of the sputtering, polishing, and electroless plating methods.

The electroless plating method among the coating methods of the separation membrane is a technique for coating a large area regardless of the shape of the support. Since the contamination of the separation membrane caused by carbon may be problematic, it is preferable to completely exclude the carbon source in the plating solution. Meanwhile, the technique is carried out at room temperature, and therefore, it not only shows excellent high-temperature durability, but also has a simple facility and economical preparation process.

The hydrogen separation membrane coated with a palladium (Pd)-containing layer, that is, the palladium-based metal separation membrane, has high hydrogen permeability and excellent hydrogen selectivity. In addition, the palladium-based metal separation membrane prepares pure hydrogen useful for fuel cells or other processes which consume hydrogen, and may be applied in various processes such as hydrogenation or dehydrogenation, etc. to improve the quality of target products.

The mechanism of separating hydrogen via the palladium-based metal membrane is as follow: hydrogen molecules ($H_2$) are first diffused into the surface of the Pd layer and then adsorbed thereto, the adsorbed hydrogen molecules are dissociated, and the dissociated hydrogen atoms (H) are diffused in the lattice of the Pd layer. Then, the hydrogen molecules are regenerated, and once regenerated, they are desorbed from the Pd layer surface, and then are separated via a diffusion process. Typically, the operating temperature of the hydrogen separation membrane is 300° C. to 600° C.

The hydrogen partial pressure P1 of the raw material side, the hydrogen partial pressure P2 of the purification side, the membrane thickness of the palladium-based metal separation membrane t, and the surface area of the metal separation membrane are the main factors in view of the permeation amount of hydrogen in the palladium-based metal separation membrane. That is, the hydrogen permeation amount Q per unit area is related to Equation 1 below.

$$Q = A \cdot t^{-1} \cdot (\sqrt{P1} - \sqrt{P2}) \qquad \text{[Equation 1]}$$

The constant A varies depending on the type and operating conditions of an alloy membrane.

As can be seen from the Equation above, in order to improve the efficiency of the hydrogen permeability, that is, to improve the permeation amount of hydrogen per unit area, I) developing an alloy having a large constant A, which is different depending on the types of alloy, II) thinning the membrane thickness of the hydrogen permeable membrane, or III) increasing the partial pressure difference of hydrogen may be considered. A method for improving the hydrogen permeability by thinning the membrane thickness is commonly considered for palladium alloy-based hydrogen permeable membranes. However, the mechanical strength decreases as the thickness of the membrane decreases. Since the hydrogen permeation amount is influenced by the partial pressure difference of hydrogen, the coexistence of thinning of the layer and the mechanical strength is required. Therefore, the thin palladium alloys are used in combination with the porous support to supplement the mechanical strength as described above.

As shown in FIG. 3, in the separation membrane reactor of the present invention, the upper parts of the tube for an exothermic reaction or the tube type heat-exchanger for heating and the upper parts of the tubes for separating hydrogen can be sealed by the adhesion between the metal tubes and tube sheet welded to the end of the tubes using the characteristics of the metal tube or by using metal fitting. In addition, the unit module can be completed by assembling the tube sheet, module cover, and module body equipped with membranes via a flange method.

Further, as shown in FIG. 3, the separation membrane reactor of the present invention can include a means of supplying natural gas and steam into the reactor shell from the lower part of the reactor, and a means of exhausting fluid, in which hydrogen in the syngas formed by the reaction catalyst for reforming natural gas in the reactor shell is removed, and a means of exhausting concentrated or separated hydrogen from the tube for separating hydrogen in the upper part of the reactor.

The operating method of the tube-type separation membrane module according to one embodiment of the present invention shown in FIG. 3 is roughly described as follows. First, the natural gas and steam are supplied from the lower parts of the reactor via the means of supplying natural gas and steam into the reactor shell and then are uniformly distributed into the reactor shell via a distributor, inducing a reforming reaction by a catalyst for reforming natural gas filled in the reactor shell, thereby generating fluid containing hydrogen and carbon dioxide, etc. therefrom. Subsequently, the hydrogen selectively penetrates the tube for separating hydrogen from the generated fluid, and is separated into two types of exhaust gases, that is, the permeate stream, which is a hydrogen-abundant fluid, and the retentate stream, which is a hydrogen-deficient fluid. The hydrogen-deficient fluid is exhausted via the means of exhausting the retentate stream in the upper part, and the hydrogen-abundant fluid is exhausted via the means of exhausting the permeate stream in the further upper part.

In another embodiment, the present invention may provide a separation membrane reactor capable of separating hydrogen simultaneously with the reforming reaction of natural gas, in which a PSA device is connected, as shown in FIG. 1c.

In the case of the separation membrane reactor capable of separating hydrogen simultaneously with the reforming reaction of natural gas, in which the PSA device is connected, the reforming reaction can be performed at low temperature compared to the existing reforming reactor for natural gas, and accordingly, it is possible to use a low-cost reactor material which is one tenth the cost of the existing reactor or less. In addition, two-stage WGS reactor is not necessary, and thus it is not necessary to supply the water and the coolant fluid for the WGS reaction. The separation membrane reactor in which the PSA device is connected, as shown in FIG. 1c, operates at the reaction temperature similar to the separation membrane shown in FIG. 1b, but can operate under lower pressure.

It is preferable to use a separation membrane with high hydrogen permeability for the separation membrane reactor in which the PSA device is connected, as shown in FIG. 1c. In addition, the hydrogen selectivity (based on $H_2/N_2$) is preferably from 3 to 1000, more preferably from 5 to 100, and most preferably from 10 to 50. That is, the high hydrogen permeability is more important than the excellence of the hydrogen selectivity. Any types of inorganic membranes can be applied to the hydrogen separation membrane for the separation membrane reactor of FIG. 1c as long as they meet the conditions above. For example, the hydrogen separation membrane consisting of nickel, nickel alloy, iron, or iron alloy is preferable. Herein, the hydrogen separation membrane used in the separation membrane reactor, in which the PSA device is connected, refers to a low-cost separation structure having a hydrogen selectivity of 20, and thus is different from the palladium-based hydrogen separation membrane having the hydrogen selectivity of 10000 or more in the separation membrane reactor of FIG. 1b. As described above, the hydrogen separation membrane used in the separation membrane reactor in which the PSA device is connected has a lower hydrogen selectivity compared to the palladium-based hydrogen separation membrane, but has higher hydrogen permeability.

Preferably, the tube for separating hydrogen of the separation membrane reactor in which the PSA device is connected, as shown in FIG. 1c, may comprise a porous support; an Ni- or Fe-based separation membrane (Ni- or Fe-based selective layer) located on the porous support; and a catalyst layer for a water gas shift reaction (WGS) located on the Ni- or Fe-based separation membrane, as shown in FIG. 5b.

In addition, as shown in FIG. 6, the separation membrane reactor, in which the PSA device is connected, may control the upstream part as an SMR region and the downstream part as a WGS region by a temperature difference in the direction of moving gas. That is, the upstream part of the separation membrane reactor is set to a temperature range of 500° C. to 600° C., which is appropriate for SMR, to produce syngas (mixture gas of $CO+H_2$) by steam reforming of natural gas via SMR, and then, the downstream part of the separation membrane reactor is set to a temperature range of 300° C. to 400° C., which is appropriate for WGS, to perform WGS at the downstream part of the separation membrane reactor, thereby decreasing the concentration of CO to 2% or less. Through such a design of the separation membrane reactor, the production of syngas and the gas purification process can be performed simultaneously in one separation membrane reactor, thereby enabling the design of a compact system.

In the present invention, the WGS and SMR regions can be distinguished by a temperature difference. In the present invention, the catalyst layer for a water gas shift reaction (WGS) may be provided throughout the SMR and WGS regions, and as described above, it can be divided into the SMR region and WGS region by a temperature difference. Further, in the present invention, the catalyst layer for a water gas shift reaction (WGS) may only be provided in the WGS region, and the temperature can be appropriately set for the relevant region.

In order to secure the ease of system expansion and maximize the module efficiency, it is possible to secure an optimal design data via a gas diffusion simulation. Accordingly, it can serve as the basic data for developing a combustor.

In addition, the present invention provides a method for preparing syngas or hydrogen from natural gas by using the shell-and-tube type reactor for reforming natural gas.

In the present invention, by employing the shell-and-tube type reactor for reforming natural gas, the syngas can be formed by the reaction catalyst for reforming natural gas via an endothermic reaction as the heat generated from the tube for an exothermic reaction or the heat-exchanger for heating, which is disposed in the center of the reactor, moves radially to the outside of the reactor, and thus, not only can the reaction be operated at a relatively low temperature range of 500° C. to 600° C., but also, in the case where at least one tube for separating hydrogen is disposed in the reactor shell, the hydrogen separation process can be carried out simultaneously with the reforming reaction of natural gas by selectively separating hydrogen from the syngas formed above into the separation tube. Therefore, the syngas or hydrogen gas can be prepared from natural gas efficiently and economically.

The factors which must be considered in the reforming reaction of natural gas and hydrogen separation process using the separation membrane reactor of the present invention includes the supply of reactants, collection of products, disposal of by-products, and recovery of waste heat and energy to maximize the efficiency.

The process can be designed by considering the factors above, and herein, the flow sheet is the same as that shown in FIG. 4.

The process shown in FIG. 4 is characterized in that the hydrogen produced is exhausted to the permeate side, and is used to preheat the natural gas for the reforming reaction and air for combustion through a heat exchanger, that the waste heat present in the exhaust gas generated from the burner is used in the steam production, and that the carbon dioxide and remaining hydrogen exhausted through the retentate side are used to collect energy through a combustor and, at the same time, are used to preheat the natural gas for fuel.

Advantageous Effects

The separation membrane reactor according to the present invention has excellent thermal efficiency and economic feasibility, and thus can reduce hydrogen production costs by 20% to 30% compared to the conventional system.

In addition, the present invention may provide cross-cutting materials and a process technology which enables economical hydrogen production and collection of carbon dioxide for the hydrogen economy.

BRIEF DESCRIPTION OF FIGURES

FIG. 1 shows a schematic diagram of the reaction process comparing the conventional reformer (FIG. 1a) and the separation membrane reformers according to one embodiment of the present invention (FIGS. 1b and 1c). FIG. 1b shows the separation membrane reactor capable of separating hydrogen simultaneously with the reforming reaction of natural gas, and FIG. 1c shows the separation membrane reactor capable of separating hydrogen simultaneously with the reforming reaction of natural gas, in which a PSA device is connected for hydrogen purification.

FIG. 2 shows a schematic diagram illustrating the process in which the production of high-purity hydrogen and the collection of carbon dioxide occur simultaneously with the reforming reaction of natural gas in the separation membrane reactor according to one embodiment of the present invention.

FIG. 3 shows a schematic diagram illustrating the structure of the tube-type separation membrane module according to one embodiment of the present invention.

FIG. 4 shows a flow-sheet illustrating the production of high-purity hydrogen and pre-combustion carbon capture storage (CCS) which occur simultaneously using the separation membrane reactor.

FIG. 5a shows a schematic diagram illustrating the cross-sectional structure of the tube for separating hydrogen which can be used in the separation membrane reactor of FIG. 1b.

FIG. 5b shows a schematic diagram illustrating the cross-sectional structure of the tube for separating hydrogen which can be used in the separation membrane reactor of FIG. 1c.

FIG. 6 shows a schematic diagram illustrating the situation where a temperature gradient is observed in the separation membrane reactor in which the hydrogen purification device is connected to the rear end as shown in FIG. 1c.

BEST MODE

Hereinafter, the present invention will be described in more detail. However, the following examples are provided for illustrative purposes only, and the scope of the present invention should not be limited thereto in any manner.

Example 1: Manufacture of Separation Membrane Reactor of the Present Invention

As illustrated in FIG. 1c and FIG. 3, the tube-type separation membrane module was manufactured according to one embodiment of the present invention, and the reaction process was designed. The Pd separation membrane having the following performance was used as a hydrogen separation membrane.

Performance of Pd separation membrane: hydrogen permeability=40 ml/min/cm$^2$, hydrogen/nitrogen selectivity=24 (at $\Delta P$=0.5 bar, 500° C.)

Experimental Example 1: Examination of Operating Efficiency of Separation Membrane Reactor of the Present Invention The reforming of natural gas and hydrogen separation process were performed simultaneously using the tube-type separation membrane module manufactured in Example 1 above, and subsequently, the operating efficiency was examined.

The experimental conditions were as follows.

GHSV=1000/h, S/C (steam to carbon ratio)=3.0, reaction temperature: 550° C.→equilibrium methane conversion rate=approx. 55% at 1 bar The results thereof are shown in Table 1 below.

TABLE 1

| Pressure difference (bar) | Operating pressure | Methane conversion rate (%) | CO concentration (%) | H$_2$/CO ratio |
| --- | --- | --- | --- | --- |
| 0 | 1.0 | 48 | 1.6 | 41 |
| 0.5 | 1.5 | 48.4 | 1.7 | 39 |
| 1.0 | 2.0 | 54 | 1.9 | 37 |
| 1.5 | 2.5 | 63 | 2.1 | 35 |
| 2 | 3.0 | 69.5 | 2.3 | 33 |

It can be confirmed through Table 1 that the separation membrane reactor of the present invention shows an excellent methane conversion rate and hydrogen separatingability even at the low temperature of 550° C. under the low pressure range of 1.0 bar to 3.0 bar.

Example 2: Manufacture of Separation Membrane Reactor of the Present Invention

As illustrated in FIG. 1c and FIG. 3, the tube-type separation membrane module was manufactured according to one embodiment of the present invention, and the reaction process was designed. The Pd separation membrane having the following performance was used as a hydrogen separation membrane.

Performance of Pd separation membrane: hydrogen permeability=50 ml/min/cm², hydrogen/nitrogen selectivity=30 (at ΔP=0.5 bar, 500° C.)

Experimental Example 2: Examination of Operating Efficiency of Separation Membrane Reactor of the Present Invention The reforming of natural gas and hydrogen separation process were performed simultaneously using the tube-type separation membrane module manufactured in Example 2 above, and subsequently, the operating efficiency was examined.

The experimental conditions were as follows.

GHSV=3500/h, S/C (steam to carbon ratio)=3.0, reaction temperature: 500° C.→equilibrium methane conversion rate=approx. 42% at 1 bar The results thereof are shown in Table 2 below.

TABLE 2

| Pressure difference (bar) | Operating pressure | Methane conversion rate (%) | CO concentration (%) | $H_2$/CO ratio |
|---|---|---|---|---|
| 1.0 | 2.0 | 36 | 1.2 | 40.5 |
| 1.5 | 2.0 | 53 | 1.5 | 42.2 |
| 1.0 | 3.0 | 68 | 1.7 | 42.1 |
| 2.5 | 3.5 | 77 | 1.9 | 41.4 |

When comparing Examples 1 and 2, it can be confirmed that a similar or higher methane conversion rate can be observed even at low temperature as the hydrogen permeability and selectively increase.

The invention claimed is:

1. A shell-and-tube type reactor for reforming natural gas, comprising a metal foam-based reaction catalyst for reforming natural gas into hydrogen and carbon dioxide, wherein the metal foam-based reaction catalyst is filled in a reactor shell of the shell-and-tube type reactor and comprises a metal foam having a catalyst material coated thereon; at least one tube for separating hydrogen; and a tube for an exothermic reaction or a tube type heat-exchanger for heating, which is disposed at the center of the shell-and-tube type reactor,
wherein the at least one tube for separating hydrogen comprises a porous support, a palladium-based hydrogen separation layer located on a first side of the porous support, a diffusion barrier located between the hydrogen separation layer and the porous support, and a catalyst layer for a water-gas-shift reaction (WGS) located on the hydrogen separation layer or a second side of the porous support.

2. The shell-and-tube type reactor of claim 1, wherein the upper or lower part of the tube for the exothermic reaction or the tube type heat-exchanger for heating and the upper or lower part of the tube for separating hydrogen are fixed in the shell-and-tube type reactor by a tube sheet.

3. The shell-and-tube type reactor of claim 1, wherein the temperature ($T_1$) of the tube for an exothermic reaction or the tube type heat-exchanger for heating is higher than the temperature ($T_2$) of the reaction catalyst filled in the reactor shell, and wherein syngas is formed via an endothermic reaction by the reaction catalyst for reforming natural gas in the reactor shell as heat moves radially to the outside of the shell-and-tube type reactor from the tube for the exothermic reaction or the tube type heat-exchanger, which is disposed at the center of the shell-and-tube type reactor.

4. The shell-and-tube type reactor of claim 1, wherein hydrogen among the syngas formed by the reaction catalyst for reforming natural gas in the reactor shell penetrates the tube for separating hydrogen and is then concentrated or separated towards the inside of the tube for separating hydrogen.

5. The shell-and-tube type reactor of claim 1, wherein a hydrogen separation membrane is formed outside or inside of the tube for separating hydrogen.

6. The shell-and-tube type reactor of claim 1, wherein the tube for separating hydrogen is formed from a ceramic comprising silica, alumina, zirconia, yttria, ceria, YSZ, or a combination thereof; a metal comprising nickel, copper, iron, palladium, ruthenium, rhodium, platinum, or a combination thereof; or a complex composition in which the metal and ceramic are mixed.

7. The shell-and-tube type reactor of claim 1, wherein the shell-and-tube type reactor has a steam methane reforming (SMR) region at the front and a water-gas-shift (WGS) region at the back in the direction of moving gas of the shell-and-tube type reactor, wherein the regions are controlled by a temperature difference.

8. The shell-and-tube type reactor of claim 7, wherein the SMR region is set to a temperature range of 500° C. to 600° C., and the WGS region is set to a temperature range of 300° C. to 400° C.

9. The shell-and-tube type reactor of claim 1, wherein the tube for the exothermic reaction is filled with at least one catalyst which can catalyze the exothermic reaction.

10. The shell-and-tube type reactor of claim 1, wherein the shell-and-tube type reactor has a means of supplying natural gas and steam into the inside of the reactor shell from a bottom part of the shell-and-tube type reactor, and a means of exhausting fluid, in which hydrogen among the syngas formed by the reaction catalyst for reforming natural gas in the reactor shell is removed, and a means of exhausting concentrated or separated hydrogen from the tube for separating hydrogen in an upper part of the shell-and-tube type reactor.

11. The shell-and-tube type reactor of claim 1, wherein a pole is inserted into the shell-and-tube type reactor in order to prevent interdiffusion resulting from contact between the tube for separating hydrogen and metal foam.

12. A method for manufacturing syngas or hydrogen from natural gas, comprising reacting the natural gas and a catalyst in the shell-and-tube type reactor for reforming natural gas of claim 1.

13. The method for manufacturing syngas or hydrogen from natural gas of claim 12, wherein the temperature ($T_1$) of the tube for an exothermic reaction or the tube type heat-exchanger for heating is higher than the temperature ($T_2$) of the reaction catalyst filled in the reactor shell, and wherein syngas is formed via an endothermic reaction by the reaction catalyst for reforming natural gas in the reactor shell as heat moves radially to the outside of the shell-andtube type reactor from the tube for the exothermic reaction or the tube type heat-exchanger, which is disposed at the center of the shell-and-tube type reactor.

14. The method for manufacturing syngas or hydrogen from natural gas of claim 12, wherein hydrogen among the syngas formed by the reaction catalyst for reforming natural gas in the reactor shell penetrates the tube for separating hydrogen and is then concentrated or separated towards the inside of the tube for separating hydrogen.

* * * * *